United States Patent
Yamamoto

(10) Patent No.: US 10,744,640 B2
(45) Date of Patent: Aug. 18, 2020

(54) PARALLEL LINK ROBOT

(71) Applicant: FANUC CORPORATION, Yamanashi (JP)

(72) Inventor: Masahiro Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 68 days.

(21) Appl. No.: 16/257,844

(22) Filed: Jan. 25, 2019

(65) Prior Publication Data

US 2019/0248000 A1    Aug. 15, 2019

(30) Foreign Application Priority Data

Feb. 14, 2018   (JP) ................................ 2018-023659

(51) Int. Cl.
  *B25J 9/00*   (2006.01)
  *B25J 9/10*   (2006.01)
  *B25J 9/16*   (2006.01)
  *B25J 18/00*  (2006.01)

(52) U.S. Cl.
  CPC .......... *B25J 9/1065* (2013.01); *B25J 9/0051* (2013.01); *B25J 9/1623* (2013.01); *B25J 18/00* (2013.01)

(58) Field of Classification Search
  CPC ...... B25J 9/1065; B25J 9/0051; B25J 9/1623; B25J 18/00; B25J 9/0018; B25J 9/0045; B25J 9/0048
  USPC ...................................................... 74/490.01
  See application file for complete search history.

(56) References Cited

U.S. PATENT DOCUMENTS

| | | |
|---|---|---|
| 5,333,514 A | 8/1994 | Toyama et al. |
| 7,013,750 B1 | 3/2006 | Kazami |
| 9,737,985 B2 * | 8/2017 | Wu ......................... B25J 9/003 |
| 9,764,482 B2 * | 9/2017 | Ilch ...................... B25J 17/0266 |
| 10,259,115 B2 * | 4/2019 | Takano .................. B25J 9/0051 |
| 2002/0043950 A1 | 4/2002 | Yim et al. |
| 2003/0041377 A1 | 3/2003 | Bailey |

(Continued)

FOREIGN PATENT DOCUMENTS

| | | | |
|---|---|---|---|
| CN | 106217351 A | 12/2016 | |
| DE | 102016215744 A1 * | 3/2018 | ............ B25J 9/0051 |

(Continued)

OTHER PUBLICATIONS

Search Report by Registered Search Organization dated Jan. 24, 2020, for Japanese Patent Application No. 2018023659.

(Continued)

*Primary Examiner* — Jake Cook
*Assistant Examiner* — Gregory Robert Weber
(74) *Attorney, Agent, or Firm* — Karceski IP Law, PLLC

(57) ABSTRACT

A parallel link robot includes a plurality of drive units and link units each driven by the corresponding drive unit. Each of the drive units includes a motor, a transmission mechanism that transmits the rotation of the motor to the link unit, and a housing that holds the motor. The housing includes a first connection portion, a second connection portion, and an opening through which the link unit extends. The first connection portion of one of the drive units and the second connection portion of another of the drive units are connected to each other, while the second connection portion of the one of the drive units and the first connection portion of another of the drive units are connected to each other.

12 Claims, 11 Drawing Sheets

(56) References Cited

U.S. PATENT DOCUMENTS

| | | |
|---|---|---|
| 2003/0192120 A1 | 10/2003 | Bailey |
| 2006/0182602 A1* | 8/2006 | Schuler ............... B23Q 1/5456 414/735 |
| 2009/0255364 A1* | 10/2009 | Nishida ................ B25J 9/108 74/490.07 |
| 2010/0263471 A1 | 10/2010 | Weber |
| 2011/0097184 A1 | 4/2011 | Kinoshita et al. |
| 2013/0017050 A1 | 1/2013 | Fukudome et al. |
| 2014/0083232 A1 | 3/2014 | Go |
| 2014/0090508 A1 | 4/2014 | Hirano |
| 2014/0096636 A1 | 4/2014 | Hirano |
| 2014/0208883 A1 | 7/2014 | Lin et al. |
| 2015/0343631 A1* | 12/2015 | Martinez-Esponda ................ B25J 11/005 74/490.03 |
| 2015/0367505 A1* | 12/2015 | Ruiz Garcia ......... B25J 9/0009 134/104.1 |
| 2017/0173792 A1 | 6/2017 | Takano et al. |
| 2018/0236655 A1 | 8/2018 | Nakanishi |
| 2019/0329422 A1* | 10/2019 | Hongo ................ B25J 13/025 |

FOREIGN PATENT DOCUMENTS

| | | |
|---|---|---|
| EP | 1213102 A1 | 12/2002 |
| EP | 2546032 A2 | 1/2013 |
| EP | 2716415 A1 | 4/2014 |
| EP | 2716921 A1 | 9/2014 |
| JP | H06270077 A | 9/1994 |
| JP | 2002172573 A | 6/2002 |
| JP | 2010247324 A | 11/2010 |
| JP | 4653848 B1 | 3/2011 |
| JP | 2013022652 A | 2/2013 |
| JP | 2014046406 A | 3/2014 |
| JP | 2014073541 A | 4/2014 |
| JP | 2014073554 A | 4/2014 |
| JP | 2017074630 A | 4/2017 |
| JP | 2017109270 A | 6/2017 |
| JP | 2018001385 A | 1/2018 |
| WO | 2018008491 A1 | 1/2018 |

OTHER PUBLICATIONS

Japanese Office Action dated Feb. 12, 2020, for Japanese Patent Application No. 2018023659.

* cited by examiner

PARALLEL LINK ROBOT

CROSS-REFERENCE TO RELATED APPLICATIONS

This application claims priority to and claims the benefit of Japanese Patent Application No. 2018-023659, filed on Feb. 14, 2018, the entire content of which is incorporated herein by reference.

FIELD OF THE INVENTION

The present invention relates to a parallel link robot.

BACKGROUND OF THE INVENTION

Parallel link robots have been known that include a plurality of sets of parallel links with the tips of the links connected to each other via a movable plate and drive each link to change at least one of the position and the posture of the movable plate (refer to, for example, Japanese Unexamined Patent Application, Publication No. 2014-46406). The parallel link robot described in Japanese Unexamined Patent Application, Publication No. 2014-46406 includes three actuator units fixed on a base portion. Each actuator unit has one set of links attached thereto and drives the link set to move the movable plate.

SUMMARY OF THE INVENTION

An aspect of the present invention provides a parallel link robot including a plurality of drive units and link units each driven by the corresponding drive unit. Each of the drive units includes a motor, a transmission mechanism that transmits the rotation of the motor to the link unit, and a housing that holds the motor. The housing includes a first connection portion, a second connection portion, and an opening through which the link unit extends. The first connection portion of one of the drive units and the second connection portion of another of the drive units are connected to each other, while the second connection portion of the one of the drive units and the first connection portion of another of the drive units are connected to each other.

DESCRIPTION OF EMBODIMENT(S) OF THE INVENTION

A parallel link robot (hereinafter simply referred to as the robot) 100 according to a first embodiment of the present invention will now be described with reference to the drawings.

Figure 1:
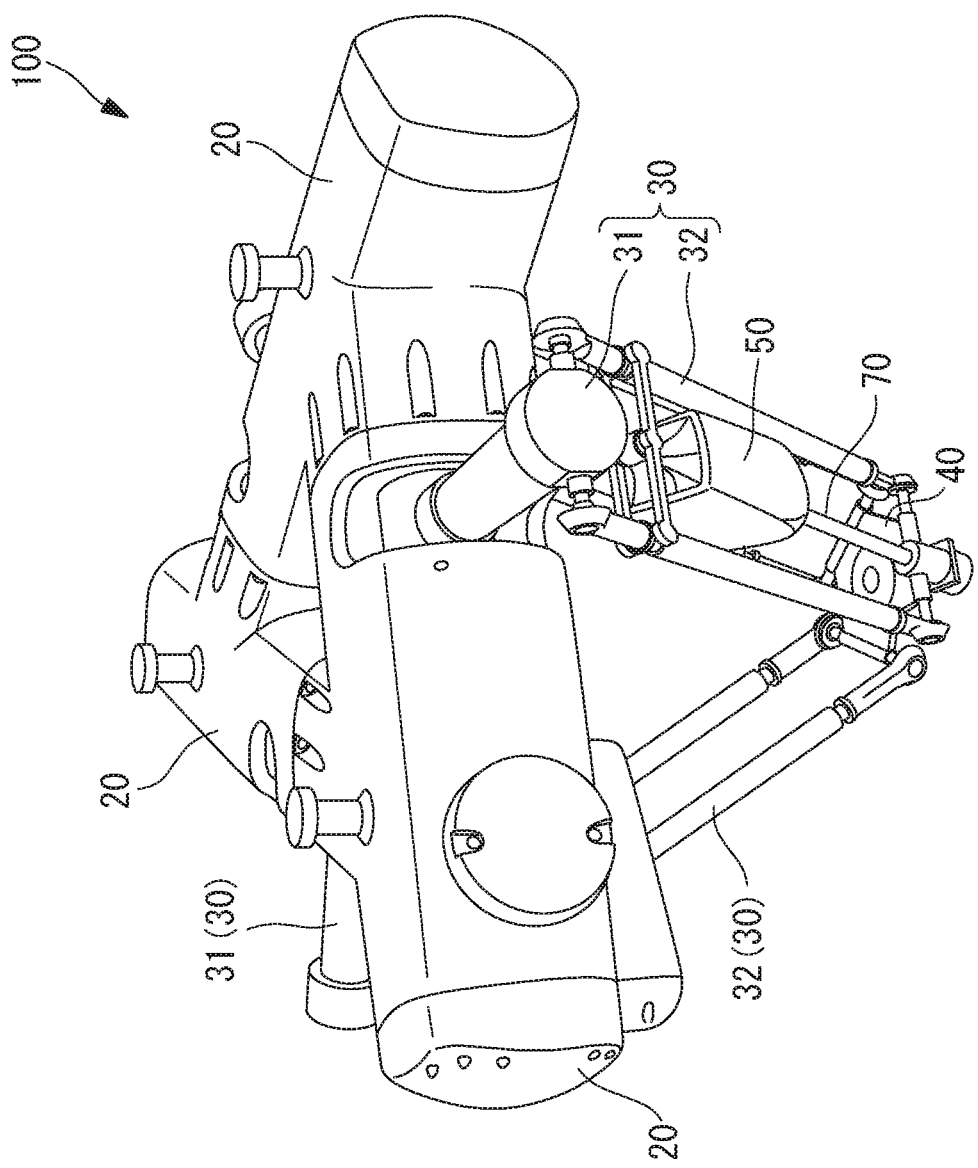
FIG. 1 is a schematic perspective view of a parallel link robot according to a first embodiment of the present invention.
Figure 2:
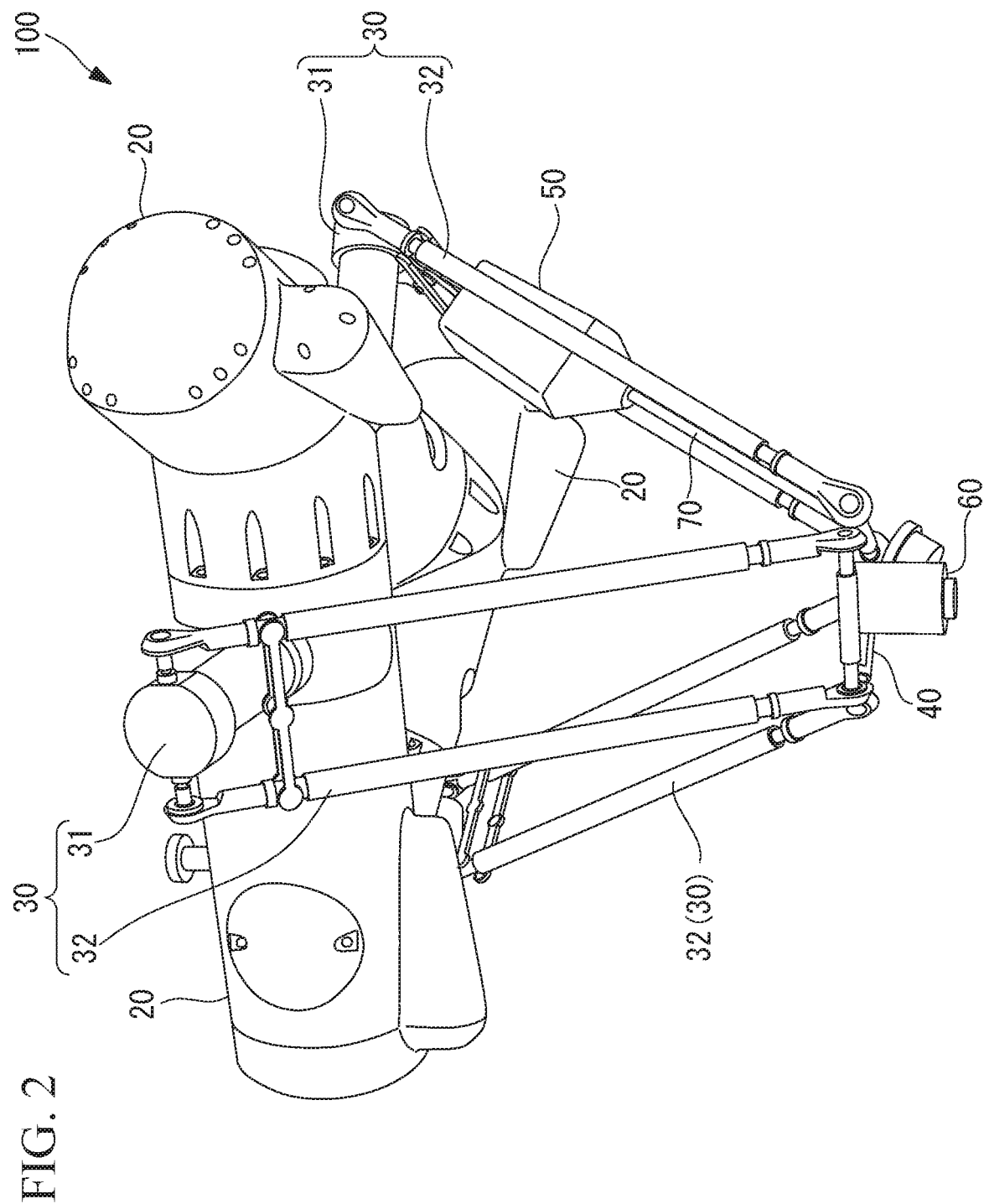
FIG. 2 is a schematic perspective view of the parallel link robot.

FIGS. 1 and 2 are schematic perspective views of the robot 100 according to the first embodiment of the present invention. The robot 100 includes three drive units 20 each containing a motor and a reduction gear, which are not shown in FIGS. 1 and 2, link units 30 driven by the motors contained in the drive units 20, a movable plate 40 attached to the tips of the link units 30, a wrist shaft 60 attached to the movable plate 40, an actuator 50 that drives the wrist shaft 60, and a driveshaft 70 that transmits the driving force of the actuator 50 to the wrist shaft 60. The robot 100 can change at least one of the position and the posture of the movable plate 40 using the three parallel link units 30 driven by the three drive units 20.

Each link unit 30 includes an arm 31 connected to the corresponding drive unit 20 and passive links 32 that are two links connecting the arm 31 and the movable plate 40. As illustrated in FIG. 1, the actuator 50 is fixed between the links of one of the three passive link sets 32. Note that the actuator 50 may not be positioned between links and may be fixed, for example, to the outside of any drive unit 20 or to the movable plate 40.

Figure 3:
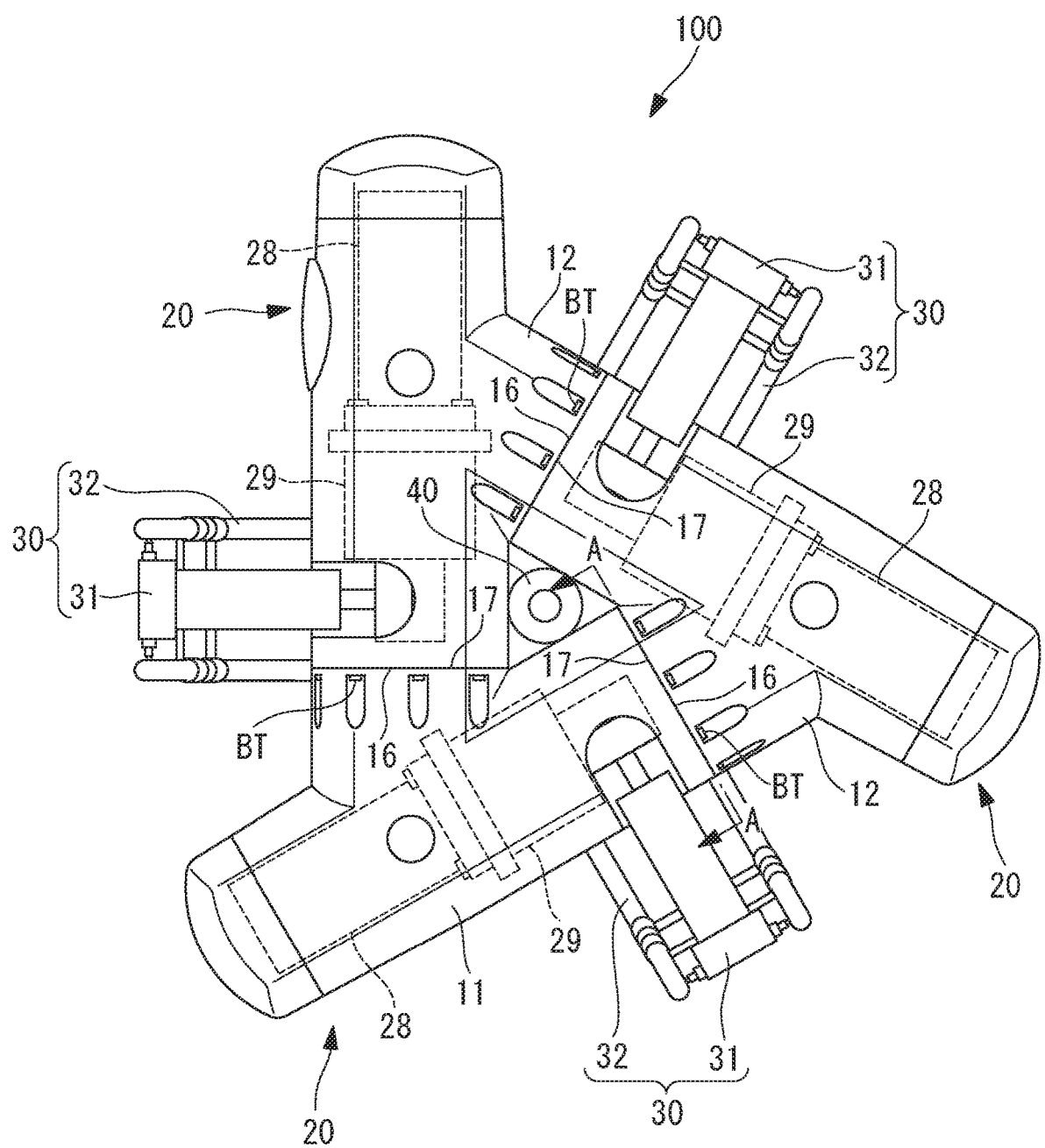
FIG. 3 is a top view of the parallel link robot.

FIG. 3 is a top view of the robot 100. FIG. 3 schematically illustrates the outer shapes of motors 28 and reduction gears (transmission mechanisms, speed reduction mechanisms) 29 in the drive units 20 by dashed lines. As illustrated in FIG. 3, each reduction gear 29 is connected to the corresponding arm 31 at the other side from the motor 28. The reduction gear 29 reduces the rotational speed of the rotational shaft of the motor 28, and transmits the rotational driving force of the motor 28 to the arm 31 with the rotational speed reduced.

The three drive units 20 are connected to each other via first connection surfaces (first connection portions) 16 and second connection surfaces (second connection portions) 17. The first connection surface 16 of one of the drive units 20 and the second connection surface 17 of another of the drive units 20 are secured to each other by a plurality of bolts BT tightened in a direction orthogonal to the first connection surface 16 and the second connection surface 17. The second connection surface 17 of the one of the drive units 20 is connected to another drive unit 20 different from the other of the drive units 20 connected to the first connection surface 16 of the one of the drive units 20.

Figure 4:
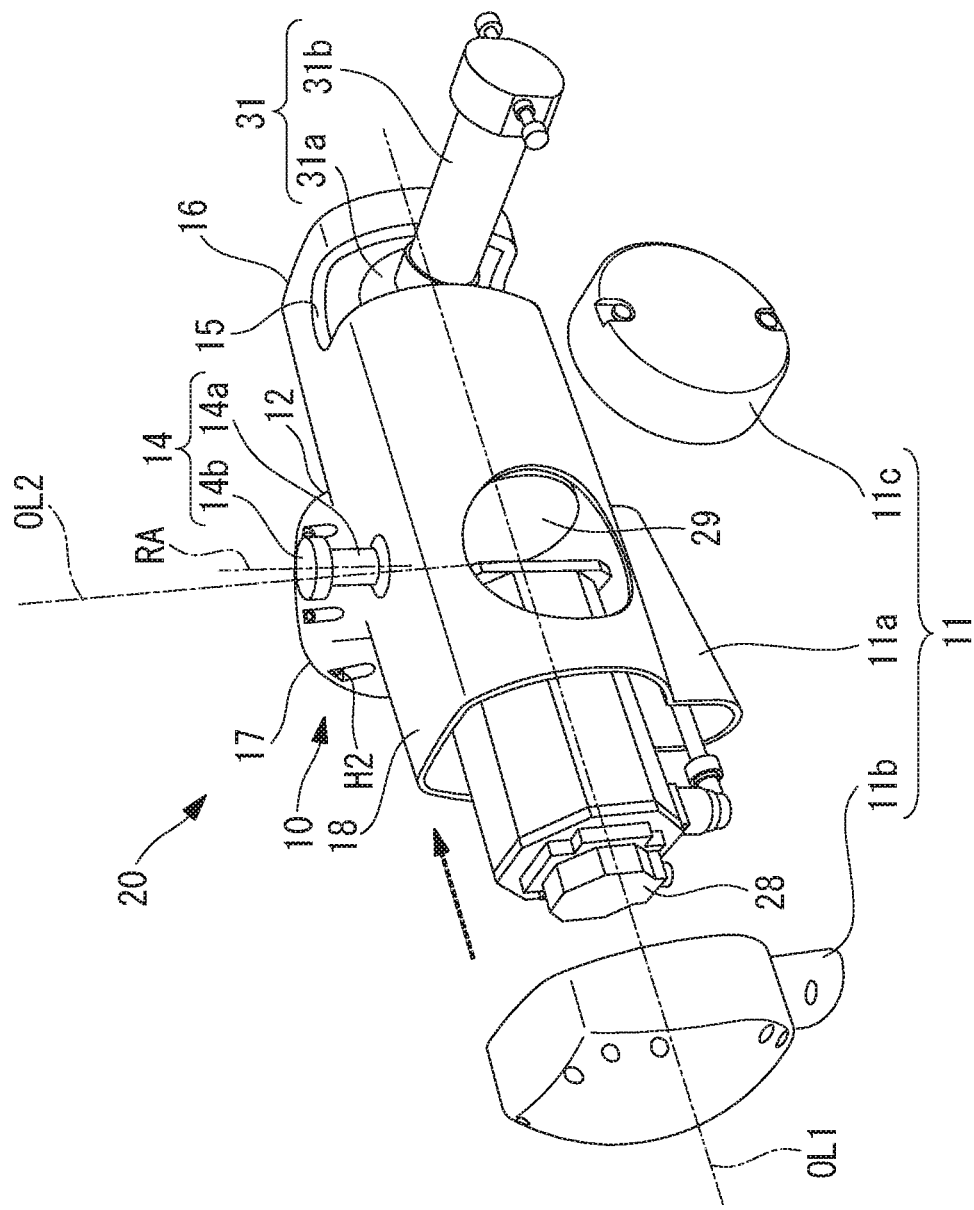
FIG. 4 is an exploded perspective view of a drive unit and an arm.

FIG. 4 is an exploded perspective view of one drive unit 20 and its arm 31. As illustrated in FIG. 4, the drive unit 20 includes the motor 28, the reduction gear 29, a housing 10 that holds the motor 28 and the reduction gear 29, and an attachment portion 14 formed on the top surface of the housing 10. The housing 10 includes a straight cylindrical main body 11 having a first axis OL1 as its central axis and a cylindrical branch 12 having a second axis OL2 as its central axis and diverging midway along the length of the first axis OL1 at an angle of 60° to the first axis OL1. The motor 28 and the reduction gear 29 are contained in the main body 11 of the housing 10 and internally held by the housing 10. In the present embodiment, the term "cylindrical"

includes a shape having a curved central axis, not a straight one, and a shape that is not circular but nearly circular in cross section.

Figure 5:
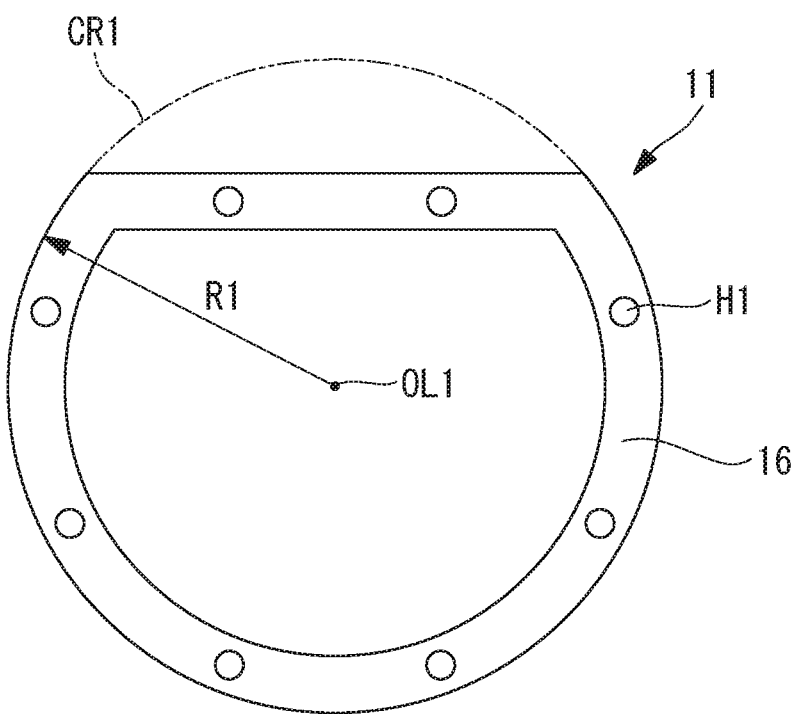
FIG. 5 is a diagram illustrating a flange shape of a first connection surface.

The first connection surface 16 is an annular flange surface orthogonal to the first axis OL1 at its center. The flange surface is the end surface of the main body 11 nearer to the reduction gear 29 in the longitudinal direction of the first axis OL1. FIG. 5 is a view taken in the arrow direction of line A-A in FIG. 3. As illustrated in FIG. 5, the first connection surface 16 has eight threaded holes H1 formed at substantially regular intervals and having an axis parallel to the first axis OL1. The main body 11 in the present embodiment has a cross-section corresponding to an imaginary circle CR1 centered around the first axis OL1 and having a radius R1, with its upper part cut off.

As illustrated in FIG. 4, the second connection surface 17 is formed at the end surface of the branch 12. The second connection surface 17 is a flange surface similar to the first connection surface 16 and orthogonal to the second axis OL2 at its center. The second connection surface 17, instead of the threaded holes H1 in the first connection surface 16, has a plurality of insertion holes H2 that receive bolts BT to be tightened in threaded holes H1. The insertion holes H2 are formed at the positions that correspond to those of the threaded holes H1 when the second connection surface 17 is aligned with the first connection surface 16 of another drive unit 20.

When the first connection surface 16 of one of the drive units 20 is aligned with the second connection surface 17 of another of the drive units 20, the bolts BT inserted in the insertion holes H2 are tightened in the threaded holes H1. This connects the two drive units 20 to each other. The unconnected first connection surface 16 and the unconnected second connection surface 17 of the two connected drive units 20 are further aligned and connected with the second connection surface 17 and the first connection surface 16 of still another drive unit 20. This connects the three drive units 20 to each other.

As illustrated in FIG. 4, the main body 11 has an opening 15 through which the arm 31 extends. The opening 15 is formed by radially cutting a part of the side surface near the first connection surface 16. The arm 31 includes a rodlike longitudinal portion 31b and a connection portion 31a at one end of the longitudinal portion 31b. The connection portion 31a is connected to the reduction gear 29. The connection portion 31a and the longitudinal portion 31b are, for example, removable from each other. This structure allows the arm 31 to be attached to the reduction gear 29 by connecting the connection portion 31a to the reduction gear 29 and then connecting the longitudinal portion 31b to the connection portion 31a through the opening 15.

As illustrated in FIG. 4, the main body 11 includes a base portion 11a having the first connection surface 16 and the opening 15, a removable end cap 11b provided at the end surface opposite to the first connection surface 16 of the main body 11, and a removable side cover 11c provided at the side surface of the base portion 11a. The removal of the end cap 11b from the base portion 11a exposes the motor 28 in the main body 11 and allows the replacement and maintenance of the motor 28. The removal of the side cover 11c from the base portion 11a allows, for example, wiring of the motor 28.

The attachment portion 14 is a member that allows the drive unit 20 to be attached to a ceiling or other position. As illustrated in FIG. 4, the attachment portion 14 is provided on a side surface 18 of the base portion 11a parallel to a plane including the first axis OL1 and the second axis OL2.

The attachment portion 14 in the present embodiment has a cylindrical portion 14a connected to the side surface 18 of the main body 11 and a disc-shaped large-diameter portion 14b at the tip of the cylindrical portion 14a. The large-diameter portion 14b is larger in cross-section than the cylindrical portion 14a. The cylindrical portion 14a and the large-diameter portion 14b have a central reference axis RA orthogonal to the side surface 18 and protrude from the side surface 18. With the shape of the attachment portion 14, the robot 100 can be attached to an upper support or a ceiling by engaging the upright attachment portion 14 with a groove that has a width smaller than the cross-sectional diameter of the large-diameter portion 14b and greater than the cross-sectional diameter of the cylindrical portion 14a.

Figure 6:
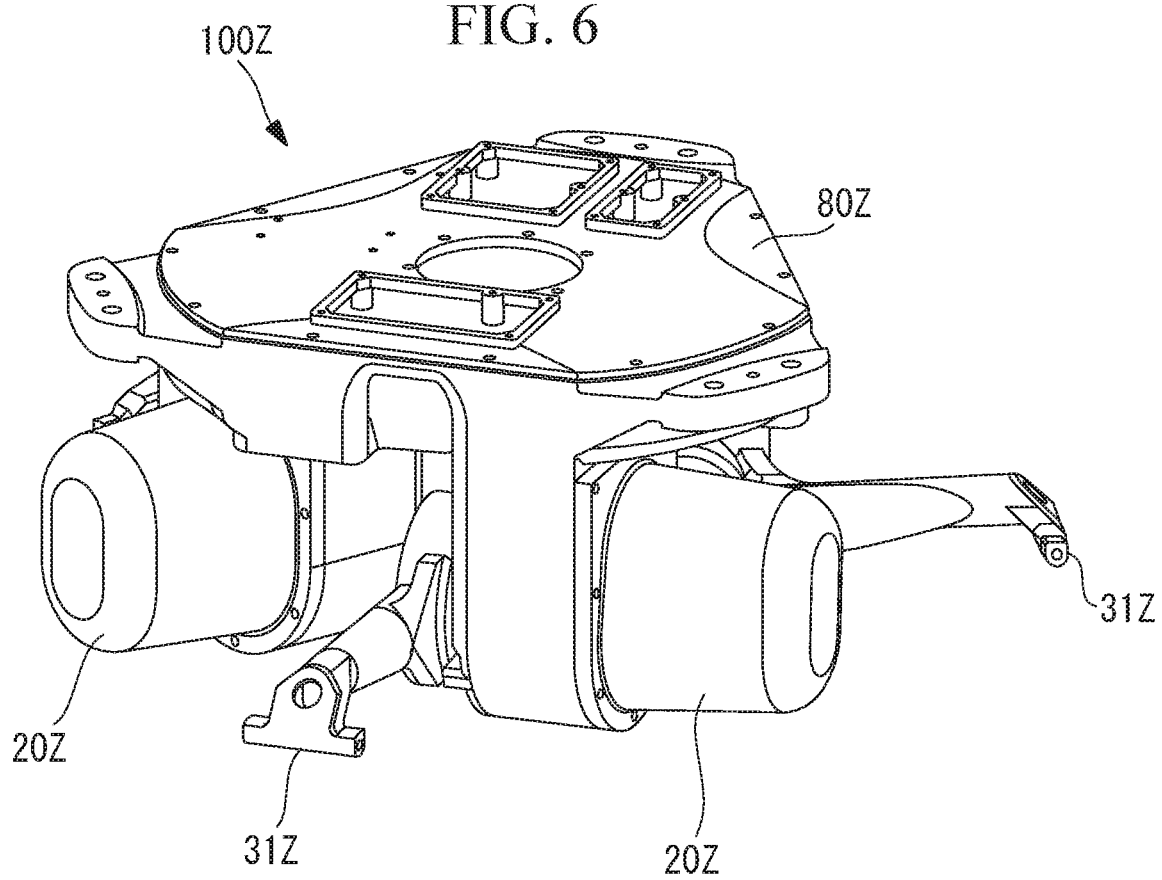
FIG. 6 is a schematic perspective view of an example of a parallel link robot shown as a comparative example.

FIG. 6 is a schematic perspective view of an example of a conventional parallel link robot (robot) 100Z shown as a comparative example. FIG. 6 does not illustrate members corresponding to the passive links 32, the movable plate 40, the wrist shaft 60, the actuator 50, and the driveshaft 70 in the present embodiment. As illustrated in FIG. 6, a drive unit 20Z connected with an arm 31Z is attached to a base portion 80Z. More specifically, drive units 20Z are indirectly connected to each other via the base portion 80Z, and not directly connected to each other.

As described above, the robot 100 in the first embodiment has the three drive units 20 connected to each other via the connection between the first connection surface 16 of one of the drive units 20 and the second connection surface 17 of another of the drive units 20. Thus, unlike the conventional robot 100Z, the robot 100 allows the three drive units 20 to be interconnected in a manner in which they are positioned relative to each other without the base portion 80Z, which positions the drive units 20Z. This allows the robot 100 to be assembled from a smaller number of components and thus have an overall height reduced by the dimension of the base portion 80Z. The reduced overall height of the robot 100 enables the robot 100 to be installed in a small space while allowing the robot 100 to have a broad motion range with longer link units 30.

Figure 7:
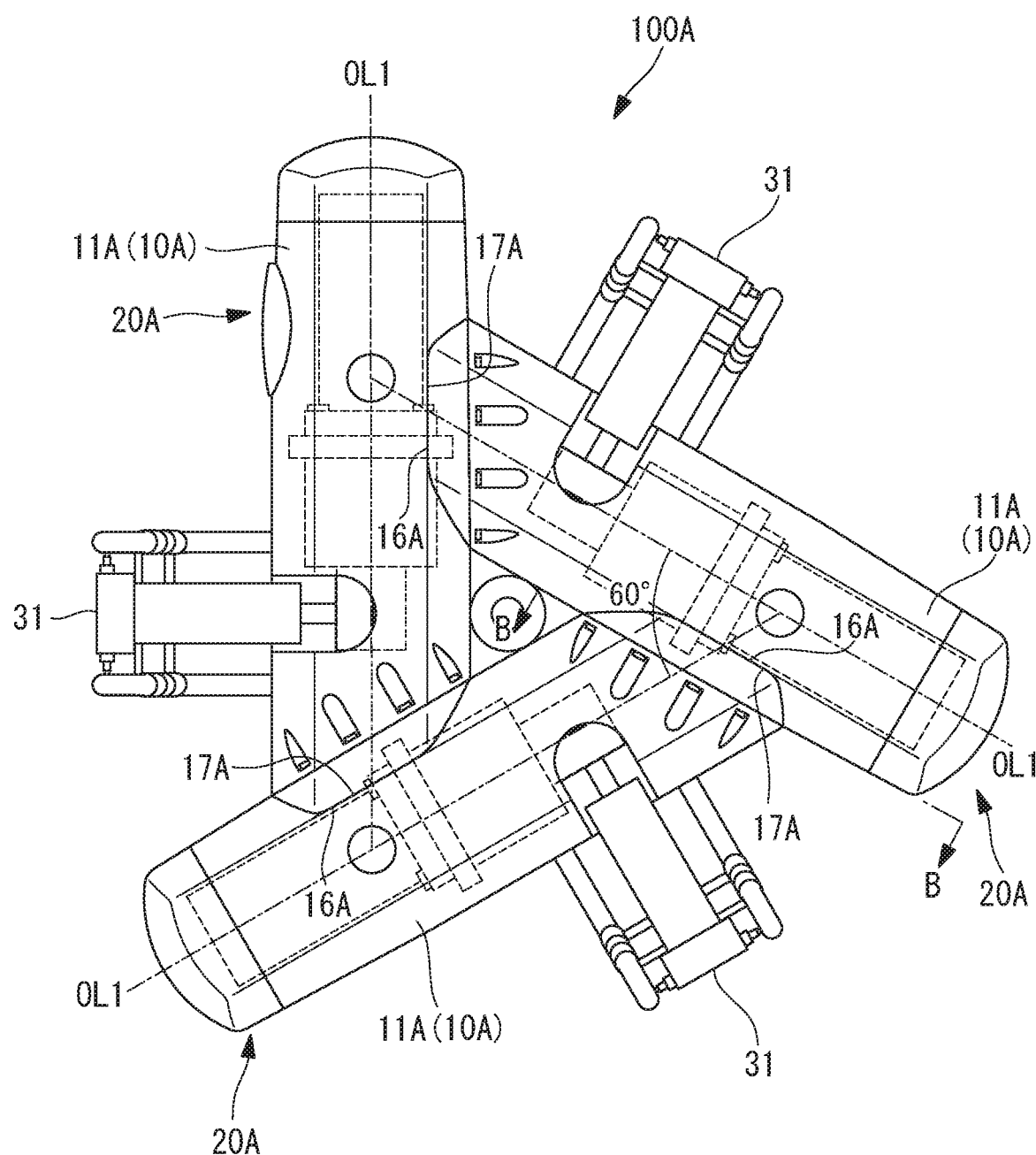
FIG. 7 is a top view of a parallel link robot according to a second embodiment of the present invention.

FIG. 7 is a top view of a robot 100A according to a second embodiment of the present invention. The robot 100A in the second embodiment is the same as the robot 100 in the first embodiment except for first connection surfaces 16A and second connection surfaces 17A compared with the robot 100 in the first embodiment. The description of the second embodiment thus centers on the first connection surfaces 16A and the second connection surfaces 17A of the robot 100A according to the second embodiment. The same components as those of the robot 100 in the first embodiment will not be described.

As illustrated in FIG. 7, in the robot 100A according to the present embodiment, each second connection surface 17A is arranged in parallel with the corresponding first axis OL1, whereas each first connection surface 16A is arranged at an angle of 60° to the corresponding first axis OL1.

Figure 8:
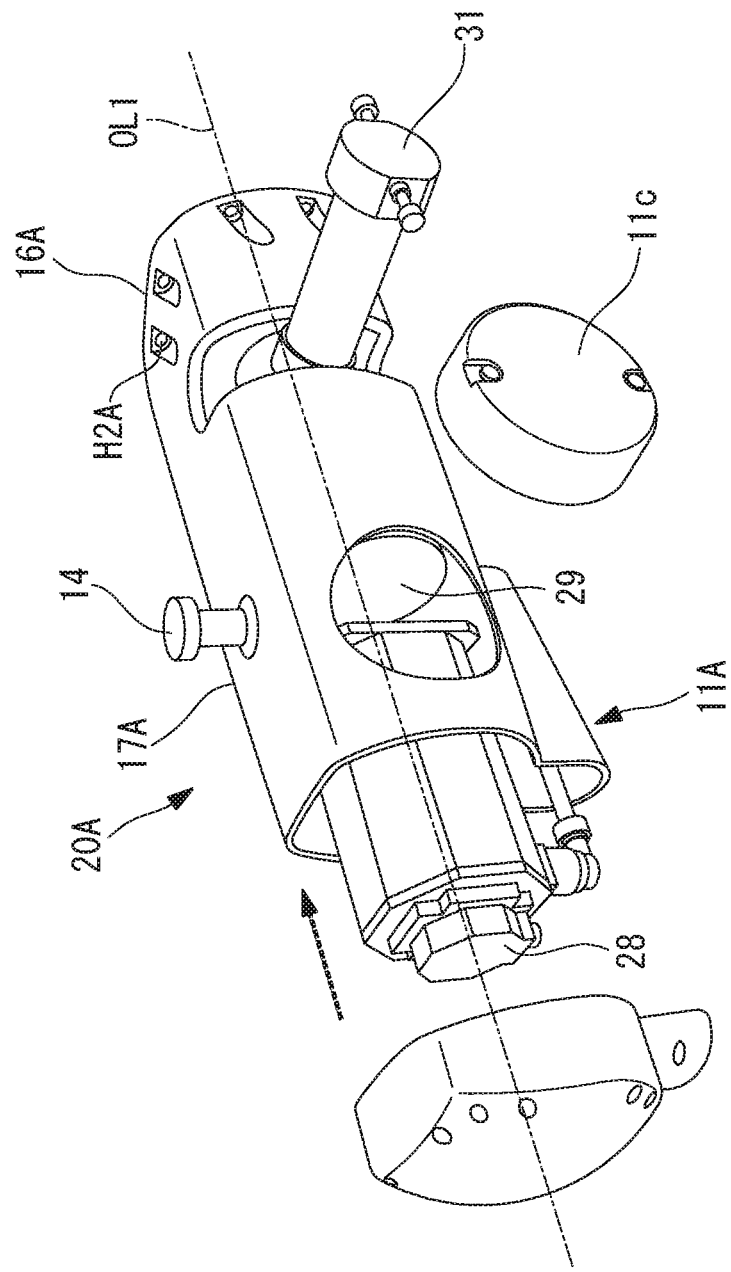
FIG. 8 is an exploded perspective view of a drive unit and an arm of the parallel link robot in FIG. 7.

FIG. 8 is an exploded perspective view of a drive unit 20A and an arm 31 in the second embodiment. A main body 11A in the second embodiment has a cylindrical shape with its part adjacent to the reduction gear 29 extended along the first axis OL1 compared with the main body 11 in the first embodiment. The second connection surface 17A is a substantially elliptical flat flange surface provided on the main body 11A near the position opposite to the side cover 11c with respect to the first axis OL1.

Figure 9:
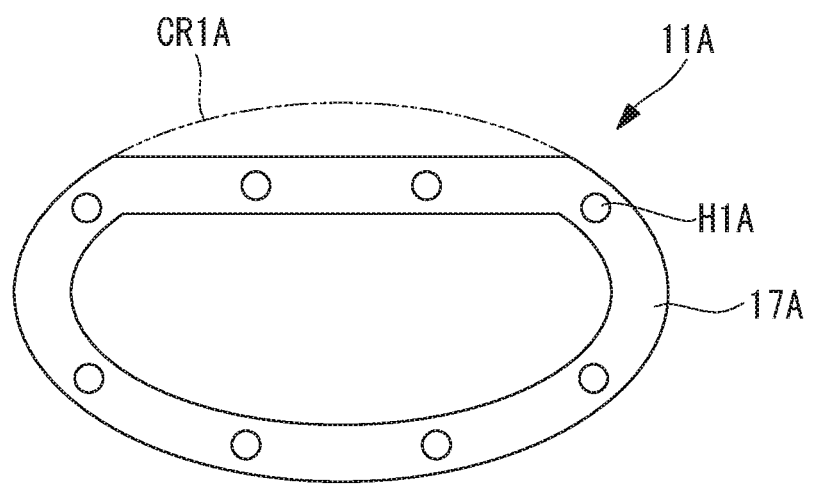
FIG. 9 is a diagram illustrating a flange shape of a second connection surface of the drive unit in FIG. 8.

FIG. 9 is a view taken in the arrow direction of line B-B inclined at an angle of 60° to the first axis OL1 in FIG. 7. In other words, FIG. 9 is a front view of a second connection surface 17A in the present embodiment. As illustrated in FIG. 9, the second connection surface 17A has eight threaded holes H1A formed at substantially regular intervals and having an axis parallel to the axis orthogonal to the second connection surface 17A. In other words, the central axis of each threaded hole H1A forms an angle of 60° to the first axis OL1. The second connection surface 17A in the second embodiment has a cross-section corresponding to an imaginary ellipse CR1A with its upper part cut off.

In the first embodiment and the second embodiment, examples of the plurality of drive units 20, 20A included in the robots 100, 100A are described. However, the structures and shapes of the robots 100, 100A and the drive units 20, 20A may be variously modified. The shapes of the components of the robots 100, 100A may be modified as long as the plurality of drive units 20, 20A are connected to each other via the first connection surfaces 16, 16A and the second connection surfaces 17, 17A.

For example, the number of drive units 20, 20A may not be three but two or four or more. If four or more drive units are used, for example, the plurality of drive units are connected cyclically in series by appropriately determining the shapes, the positions, and the orientations of the main bodies 11 and the branches 12 in the first embodiment. If two drive units are used, the first connection surface of one drive unit is connected with the second connection surface of the other drive unit, and the other second connection surface is connected with the other first connection surface. In this case, for example, the branch 12 in the first embodiment may not be a straight cylindrical portion having the second axis OL2 as its central axis, and the second axis OL2 may be curved.

The first connection surfaces 16, 16A and the second connection surfaces 17, 17A may not be flange-shaped. The first connection surface of one of the drive units and the second connection surface of another of the drive units may be connected by means of other components or by applying any known art. In addition, the number and arrangement of the threaded holes H1, H1A formed in the first connection surfaces 16 and the second connection surfaces 17A may also be variously modified.

Although the robot 100 includes the attachment portion 14 used to attach the robot 100 to a ceiling or other position, the attachment portion may not be included. The shape of the attachment portion 14 may also be variously modified depending on the environment in which the robot 100 is installed. For example, the attachment portion 14 may be a threaded hole. In the main body 11, the end cap 11b or the side cover 11c may not be removable from the base portion 11a.

Figure 10:
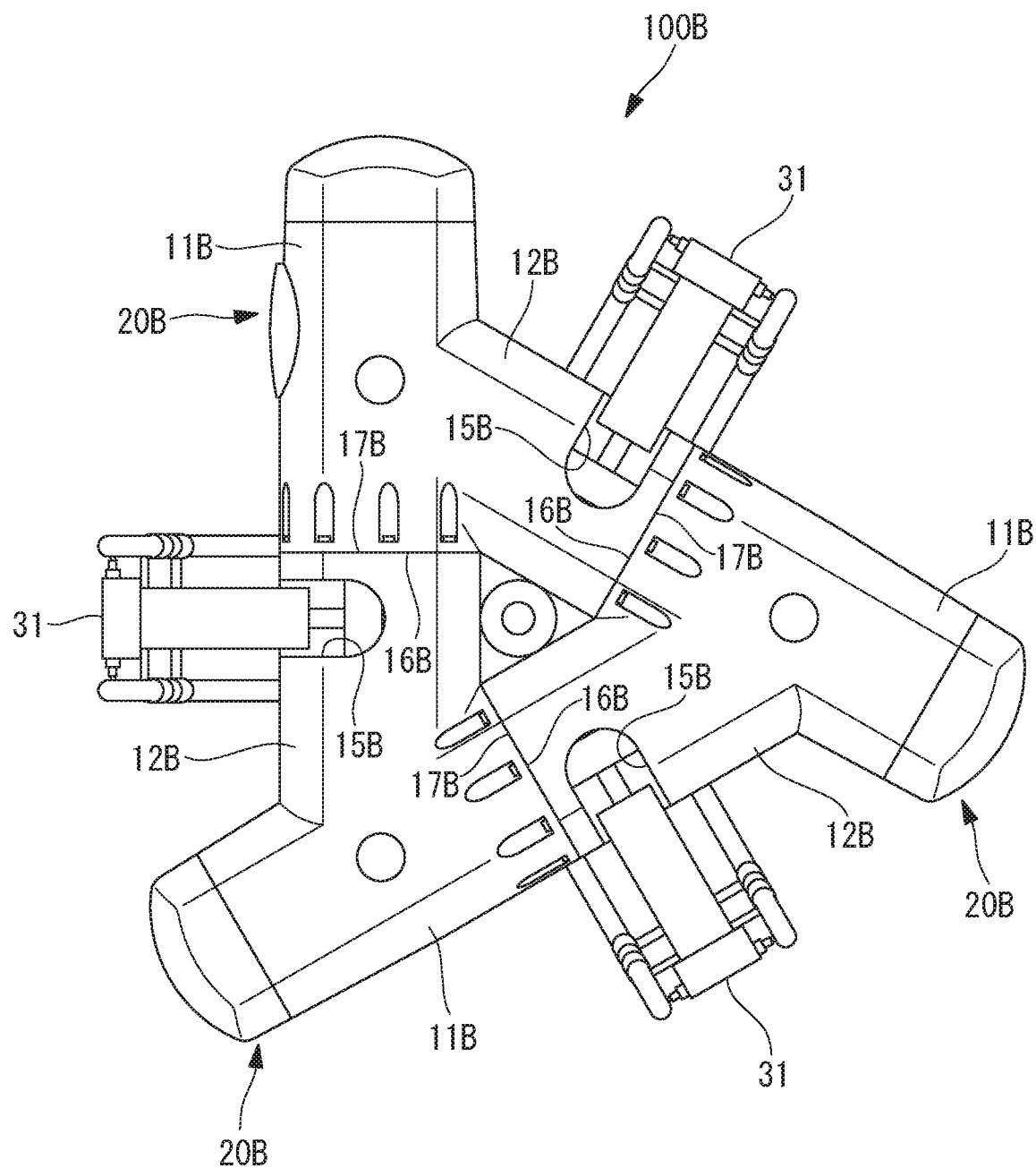
FIG. 10 is a top view of a modification of the parallel link robot in FIG. 1.
Figure 11:
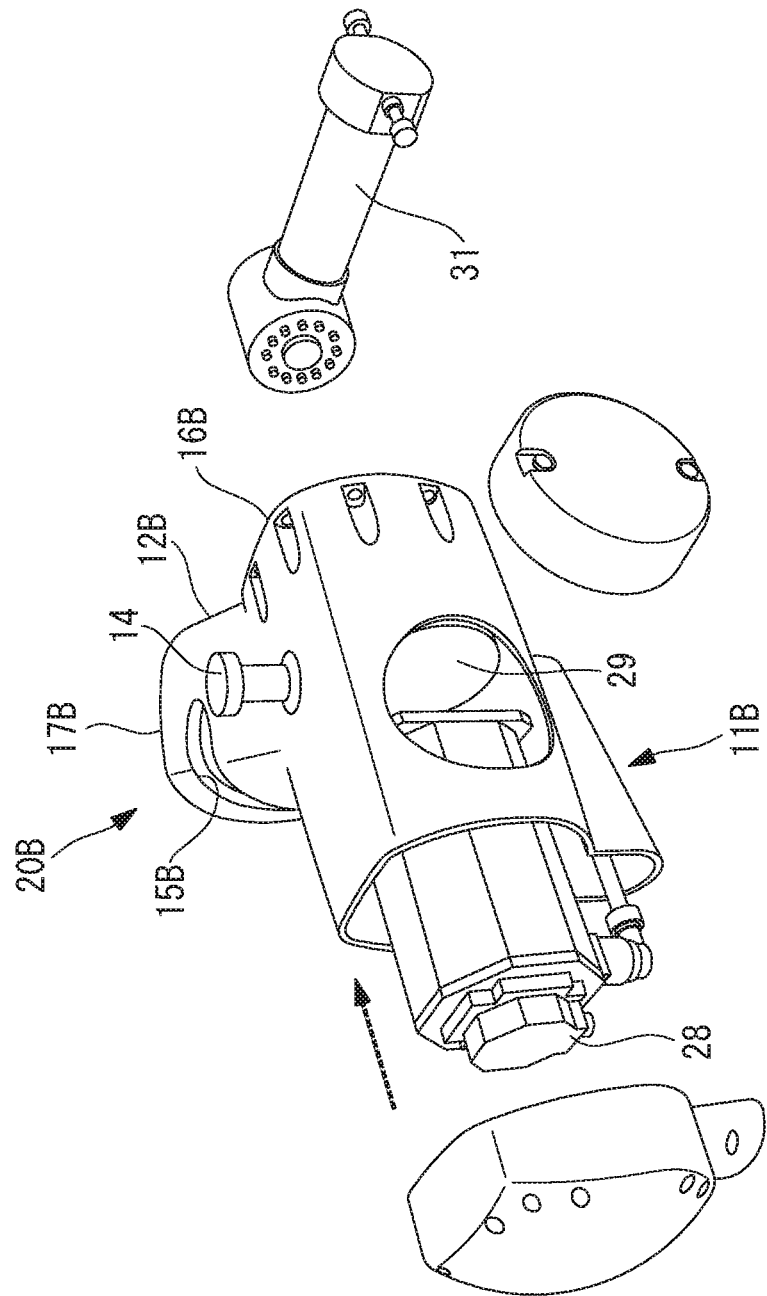
FIG. 11 is an exploded perspective view of a drive unit and an arm of the parallel link robot in FIG. 10.

As illustrated in FIGS. 10 and 11, an opening 15B through which an arm 31 extends may be formed in the side surface of a branch 12B, not in the side surface of a main body 11B. In such a robot 100B, the opening 15B of one of the drive units 20B receives the arm 31 driven by another of the drive units 20B including a first connection surface 16B connected to a second connection surface 17B of the one of the drive units 20B. In short, the opening 15B of one drive unit 20B receives the arm 31 driven by another drive unit 20B. In this manner, an opening 15B may not receive the arm 31 driven by the drive unit 20B having this opening 15B.

Figure 12:
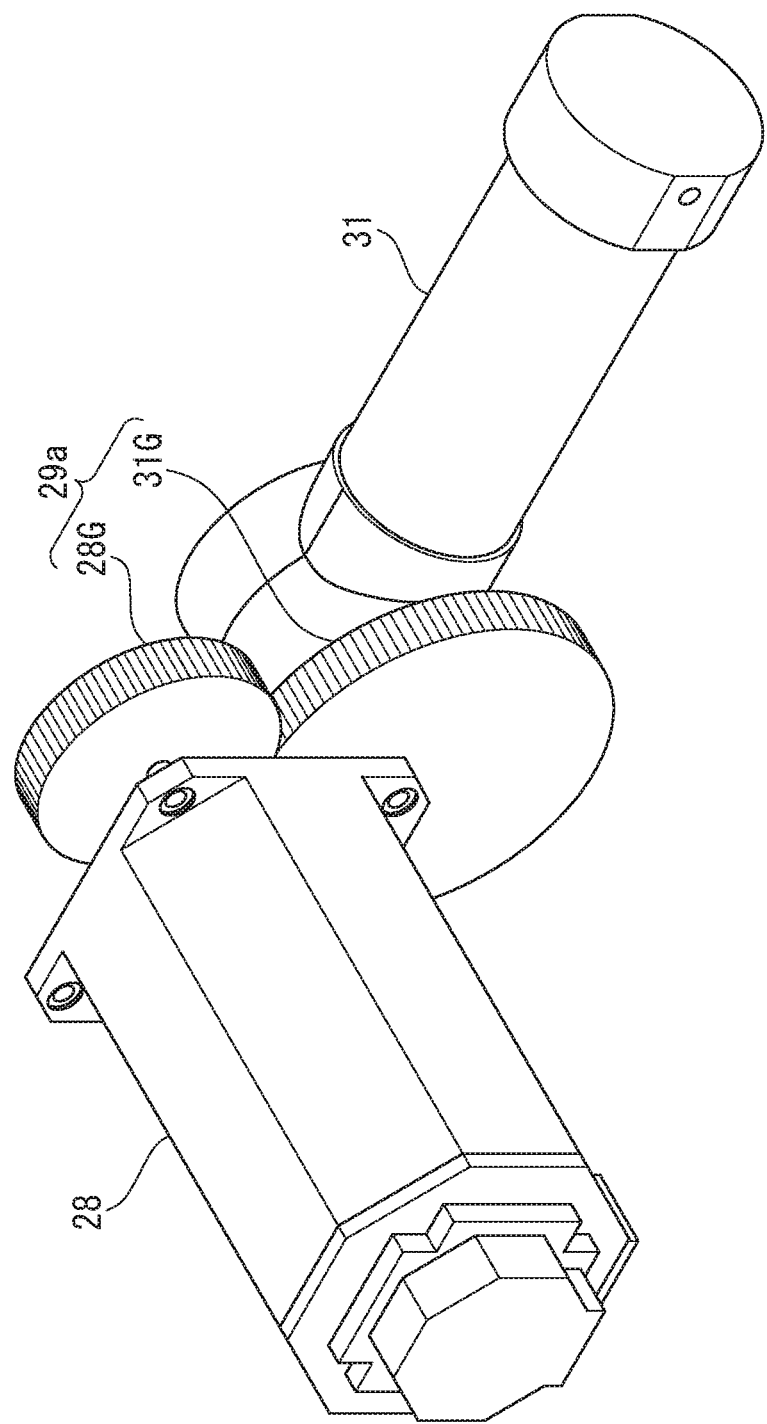
FIG. 12 is a perspective view of a motor, an arm, and a speed reduction mechanism according to a modification.

Although each drive unit 20 of the robot 100 in the above embodiment includes the reduction gear 29 as a speed reduction mechanism that reduces the rotational speed of the motor 28, the speed reduction mechanism may not be the reduction gear 29. For example, as illustrated in FIG. 12, a drive unit in a modification may include a speed reduction mechanism (transmission mechanism) 29a that is a double gear mechanism including a motor gear 28G fixed to the rotational shaft of the motor 28 and an arm gear 31G fixed to the drive shaft of the arm 31. In this modification, the motor gear 28G has teeth smaller in number than those of the arm gear 31G, and thus the rotational speed of the motor 28 is reduced and transmitted to the arm 31. Furthermore, a drive unit may not include a speed reduction mechanism such as the reduction gear 29. For example, the rotational shaft of the motor 28 may be directly connected to the drive shaft of the arm 31, and the rotation of the motor 28 may be directly transmitted to the arm 31.

From the above-described embodiment, the following invention is derived.

An aspect of the present invention provides a parallel link robot including a plurality of drive units and link units each driven by the corresponding drive unit. Each of the drive units includes a motor, a transmission mechanism that transmits the rotation of the motor to the link unit, and a housing that holds the motor. The housing includes a first connection portion, a second connection portion, and an opening through which the link unit extends. The first connection portion of one of the drive units and the second connection portion of another of the drive units are connected to each other, while the second connection portion of the one of the drive units and the first connection portion of another of the drive units are connected to each other.

According to the present aspect, the first connection portions and the second connection portions provided on housings enable a plurality of drive units to be connected to each other. More specifically, the plurality of drive units can be interconnected in a manner in which they are directly positioned relative to each other without the base portion. The base portion can thus be removed. This can reduce the number of components and the overall height of the parallel link robot. The reduced overall height of the parallel link robot enables the robot to be installed in a small space while allowing the robot to have a broad motion range.

In this aspect, the transmission mechanism may include a speed reduction mechanism that is held in the housing and reduces and transmits the rotational speed of the motor to the link unit.

This structure can transform the motor rotation into the torque and rotational speed needed to drive the link unit and then transmit them to the link unit.

In this aspect, the housing may include a straight cylindrical main body and a cylindrical branch. The main body contains the motor and the transmission mechanism, and the branch diverges midway along the length of the main body. The first connection portion may include a flange surface provided on the longitudinal end surface of the main body, and the second connection portion may include a flange surface provided on the longitudinal end surface of the branch.

This structure enables a plurality of drive units to be held in a manner in which they are directly positioned relative to each other by interconnecting the flange surface provided on the end portion of the housing main body of one of the drive units and the flange surface provided on the end portion of the housing branch of another of the drive units.

In this aspect, the first connection portion and the second connection portion of one of the drive units may be connected to another of the drive units.

This structure enables a plurality of drive units to be connected cyclically. The parallel link robot may have any number of drive units cyclically coupled by appropriately determining the angle of the branch to the main body and the lengths of the main body and the branch.

In this aspect, the opening may be formed in a side surface of the main body.

This structure enables drive units to be easily assembled by simply interconnecting a plurality of drive units in each of which the link unit is fixed to the transmission mechanism through the opening. With the opening provided in the side surface of the main body, the first connection portion may be a continuous annular flange surface, which achieves a parallel link robot having high rigidity.

In this aspect, the drive unit may include an attachment portion on at least one of the side surfaces facing each other across the plane formed by the central axis of the main body and the central axis of the branch. The attachment portion fixes the drive unit to the outside.

This structure enables the parallel link robot to be easily attached to an upper support or a ceiling using the attachment portion on a side surface of the parallel link robot with the side surface facing upward.

In this aspect, the attachment portion may include a cylindrical portion connected to the side surface and having a central reference axis orthogonal to the plane, and a large-diameter portion connected to the other end of the cylindrical portion and having the central reference axis. The large-diameter portion is larger in cross-section than the cylindrical portion.

With this configuration, if an upper support or a ceiling above the attachment portion of the parallel link robot has a groove larger than the cross-section of the cylindrical portion and smaller than the cross-section of the large-diameter portion, the large-diameter portion may be engaged with the groove to attach the parallel link robot to the support or the ceiling. More specifically, the parallel link robot can be easily attached to a support or a ceiling with such a simple structure.

The invention claimed is:

1. A parallel link robot comprising:
a plurality of drive units; and
link units each driven by the corresponding drive unit,
wherein each of the drive units includes a motor, a transmission mechanism configured to transmit rotation of the motor to the link unit, and a housing configured to hold the motor, and
the housing includes a straight cylindrical main body configured to contain the motor and the transmission mechanism, a cylindrical branch diverging midway along the length of the main body, a first connection portion including a flange surface provided on a longitudinal end surface of the main body, a second connection portion including a flange surface provided on a longitudinal end surface of the branch, and an opening through which the link unit extends, the first connection portion of one of the drive units and the second connection portion of another of the drive units being connected to each other, the second connection portion of the one of the drive units and the first connection portion of another of the drive units being connected to each other.

2. The parallel link robot according to claim 1, wherein the transmission mechanism includes a speed reduction mechanism held in the housing and configured to reduce and transmit a rotational speed of the motor to the link unit.

3. The parallel link robot according to claim 1, wherein the first connection portion and the second connection portion of one of the drive units are connected to another of the drive units.

4. The parallel link robot according to claim 1, wherein the opening is formed in a side surface of the main body.

5. The parallel link robot according to claim 1, wherein the drive unit includes an attachment portion on at least one of side surfaces facing each other across a plane formed by a central axis of the main body and a central axis of the branch, the attachment portion being configured to fix the drive unit to outside.

6. The parallel link robot according to claim 5, wherein the attachment portion includes a cylindrical portion connected to the side surface and having a central reference axis orthogonal to the plane, and a large-diameter portion connected to another end of the cylindrical portion and having the central reference axis, the large-diameter portion being larger in cross-section than the cylindrical portion.

7. A parallel link robot comprising:
a plurality of drive units; and
link units each driven by the corresponding drive unit,
wherein each of the drive units includes a motor, a transmission mechanism configured to transmit rotation of the motor to the link unit, and a housing configured to hold the motor, and
the housing includes a straight cylindrical main body configured to contain the motor and the transmission mechanism, a first connection portion including a flange surface provided on a longitudinal end surface of the main body, a second connection portion including a flange surface provided midway in a longitudinal direction of the main body, and an opening through which the link unit extends, the first connection portion of one of the drive units and the second connection portion of another of the drive units being connected to each other, the second connection portion of the one of the drive units and the first connection portion of another of the drive units being connected to each other.

8. The parallel link robot according to claim 7, wherein the transmission mechanism includes a speed reduction mechanism held in the housing and configured to reduce and transmit a rotational speed of the motor to the link unit.

9. The parallel link robot according to claim 7, wherein the first connection portion and the second connection portion of one of the drive units are connected to another of the drive units.

10. The parallel link robot according to claim 7, wherein the opening is formed in a side surface of the main body.

11. The parallel link robot according to claim 7, wherein the drive unit includes an attachment portion on at least one of side surfaces facing each other across a predetermined plane of the main body, and the predetermined plane being orthogonal to the flange surface of the second connection portion and being a plane including the central axis of the main body.

12. The parallel link robot according to claim 11, wherein the attachment portion includes a cylindrical portion connected to the side surface and having a central reference axis orthogonal to the plane, and a large-diameter portion connected to another end of the cylindrical portion and having the central reference axis, the large-diameter portion being larger in cross-section than the cylindrical portion.

* * * * *